US012670725B2

(12) United States Patent
Uwabo et al.

(10) Patent No.: US 12,670,725 B2
(45) Date of Patent: Jun. 30, 2026

(54) SPEED LIMIT RECOGNITION METHOD AND SPEED LIMIT RECOGNITION DEVICE

(71) Applicant: Nissan Motor Co., Ltd., Yokohama (JP)

(72) Inventors: Kazuyuki Uwabo, Kanagawa (JP); Yasuhisa Taira, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 338 days.

(21) Appl. No.: 18/563,216

(22) PCT Filed: May 28, 2021

(86) PCT No.: PCT/JP2021/020482
§ 371 (c)(1),
(2) Date: Nov. 21, 2023

(87) PCT Pub. No.: WO2022/249468
PCT Pub. Date: Dec. 1, 2022

(65) Prior Publication Data
US 2024/0221387 A1     Jul. 4, 2024

(51) Int. Cl.
*G06V 20/58*          (2022.01)
*G06V 10/74*          (2022.01)

(52) U.S. Cl.
CPC .......... *G06V 20/582* (2022.01); *G06V 10/761* (2022.01)

(58) Field of Classification Search
None
See application file for complete search history.

(56) References Cited

U.S. PATENT DOCUMENTS 10,169,669 B2 *   1/2019   Yoshitomi .......... G08G 1/09623
2015/0302747 A1   10/2015   Ro
(Continued)

FOREIGN PATENT DOCUMENTS

CN        105046999 A      11/2015
JP        2009-120111 A     6/2009
(Continued)

OTHER PUBLICATIONS

R. Marmo and L. Lombardi, "Milepost sign detection, " 2006 International Workshop on Computer Architecture for Machine Perception and Sensing, Montreal, QC, Canada, 2006, pp. 93-98, doi: 10.1109/CAMP.2007.4350361 (Year: 2006).*

*Primary Examiner* — Amandeep Saini
*Assistant Examiner* — Caroline Tabancay Duffy
(74) *Attorney, Agent, or Firm* — Young Basile Hanlon & MacFarlane, P.C.

(57) ABSTRACT

A speed limit recognition method recognizes a speed limit sign from the captured image, determines whether or not a plurality of speed limit signs are recognized from the captured image, when determining that a plurality of speed limit signs are recognized, determines whether or not the plurality of speed limit signs include speed limit signs respectively existing in right front and left front of the own vehicle and indicating the same speed limit, and when determining that the plurality of speed limit signs include speed limit signs respectively existing in right front and left front of the own vehicle and indicating the same speed limit, recognizes a speed limit indicated by the speed limit signs respectively existing in right front and left front of the own vehicle to be a speed limit of a road on which the own vehicle travels.

5 Claims, 4 Drawing Sheets

(56)                    References Cited

U.S. PATENT DOCUMENTS

| | | | |
|---|---|---|---|
| 2016/0350606 A1 | 12/2016 | Yoshitomi et al. | |
| 2017/0106864 A1* | 4/2017 | Masuda | G06V 20/582 |
| 2018/0225530 A1* | 8/2018 | Kunze | G06V 20/588 |
| 2020/0193194 A1* | 6/2020 | Zhang | G06F 18/217 |

FOREIGN PATENT DOCUMENTS

| | | |
|---|---|---|
| JP | 2016-224718 A | 12/2016 |
| JP | 2019-059361 A | 4/2019 |
| JP | 2019-212189 A | 12/2019 |
| JP | 2021-014239 A | 2/2021 |
| WO | 2017/132645 A1 | 8/2017 |

* cited by examiner

F I G. 1

182 — RES +

186

18

184 — CANCEL

181

183 — SET −

185

34

EXPRESS

SPEED LIMIT 65

33

31

EXPRESS

SPEED LIMIT 65 | SPEED LIMIT 55

32

SPEED LIMIT 55

Figure 5:
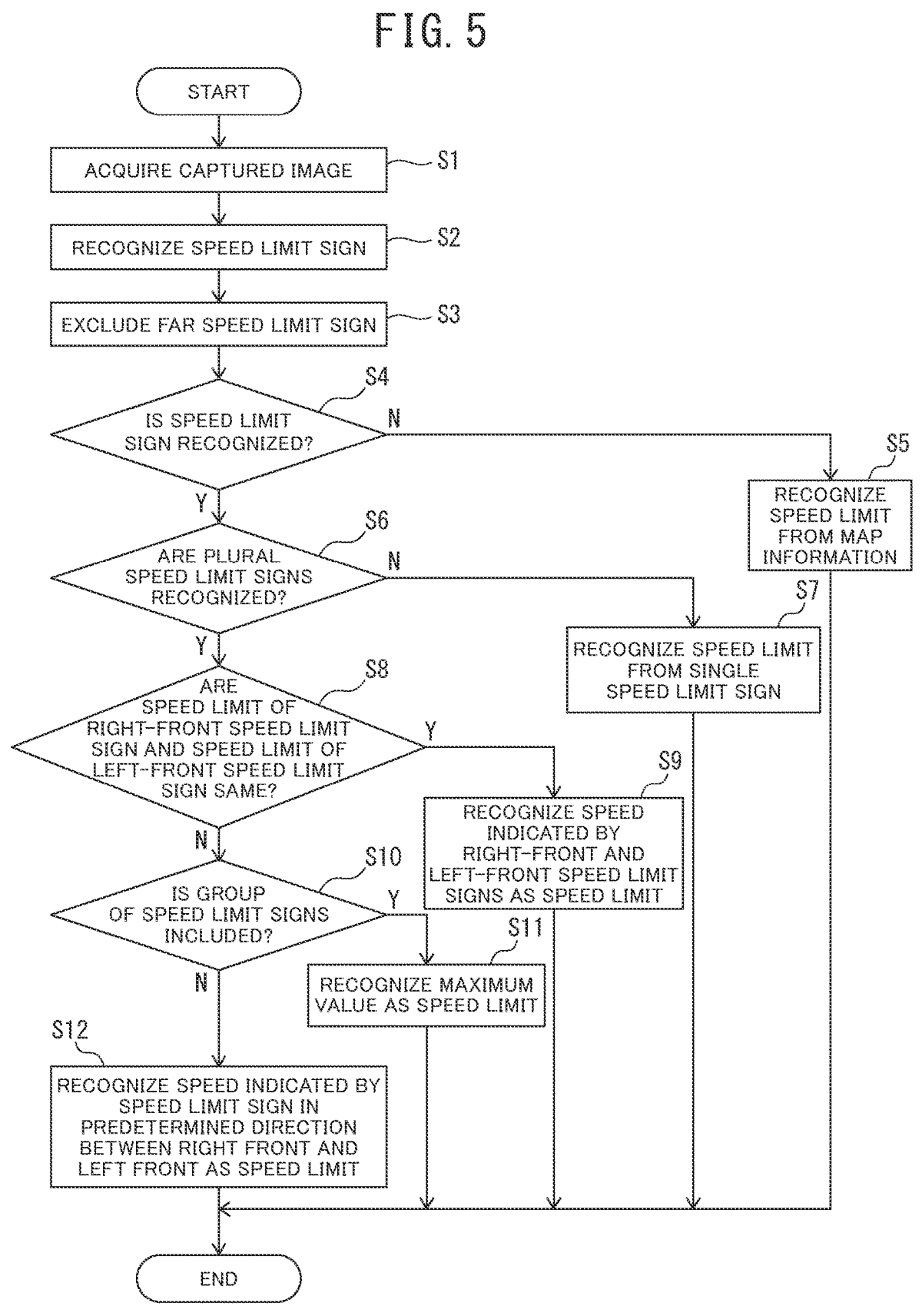

START

ACQUIRE CAPTURED IMAGE — S1

RECOGNIZE SPEED LIMIT SIGN — S2

EXCLUDE FAR SPEED LIMIT SIGN — S3

S4
IS SPEED LIMIT SIGN RECOGNIZED?
— N →
S5
RECOGNIZE SPEED LIMIT FROM MAP INFORMATION

Y ↓

S6
ARE PLURAL SPEED LIMIT SIGNS RECOGNIZED?
— N →
S7
RECOGNIZE SPEED LIMIT FROM SINGLE SPEED LIMIT SIGN

Y ↓

S8
ARE SPEED LIMIT OF RIGHT–FRONT SPEED LIMIT SIGN AND SPEED LIMIT OF LEFT–FRONT SPEED LIMIT SIGN SAME?
— Y →
S9
RECOGNIZE SPEED INDICATED BY RIGHT–FRONT AND LEFT–FRONT SPEED LIMIT SIGNS AS SPEED LIMIT

N ↓

S10
IS GROUP OF SPEED LIMIT SIGNS INCLUDED?
— Y →
S11
RECOGNIZE MAXIMUM VALUE AS SPEED LIMIT

N ↓

S12
RECOGNIZE SPEED INDICATED BY SPEED LIMIT SIGN IN PREDETERMINED DIRECTION BETWEEN RIGHT FRONT AND LEFT FRONT AS SPEED LIMIT

END

SPEED LIMIT RECOGNITION METHOD AND SPEED LIMIT RECOGNITION DEVICE

TECHNICAL FIELD

The present invention relates to a speed limit recognition method and a speed limit recognition device.

BACKGROUND

In JP 2021-014239 A described below, a vehicle control device configured to select one of a speed limit recognized based on an image acquired by an image acquisition means, a speed limit recognized based on map information, and a speed limit recognized based on communication with the outside and perform travel control, based on the selected speed limit is described.

SUMMARY

However, when a plurality of speed limit signs are recognized from a captured image acquired by a camera, the vehicle control device described in JP 2021-014239 A cannot select which of speeds indicated by the speed limit signs respectively is to be recognized as a speed limit.

An object of the present invention is to improve precision of speed limit recognition in the case where a plurality of speed limit signs are recognized from a captured image acquired by a camera.

According to an aspect of the present invention, there is provided a speed limit recognition method causing a controller to execute processing including: acquiring a captured image representing an environment in front of an own vehicle from a camera; recognizing a speed limit sign from the captured image; determining whether or not a plurality of speed limit signs are recognized from the captured image; when determining that the plurality of speed limit signs are recognized, determining whether or not the plurality of speed limit signs include speed limit signs respectively existing in right front and left front of the own vehicle and indicating a same speed limit; and when determining that the plurality of speed limit signs include speed limit signs respectively existing in right front and left front of the own vehicle and indicating a same speed limit, recognizing a speed limit indicated by the speed limit signs respectively existing in right front and left front of the own vehicle to be a speed limit of a road on which the own vehicle travels.

According to an aspect of the present invention, it is possible to improve precision of speed limit recognition in the case where a plurality of speed limit signs are recognized from a captured image acquired by a camera.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 1 is a diagram illustrative of an example of a schematic configuration of a vehicle on which a driving assistance device of an embodiment is mounted;

FIG. 5 is a flowchart of an example of a speed limit recognition method of the embodiment.

DETAILED DESCRIPTION (Configuration)

Figure 1:
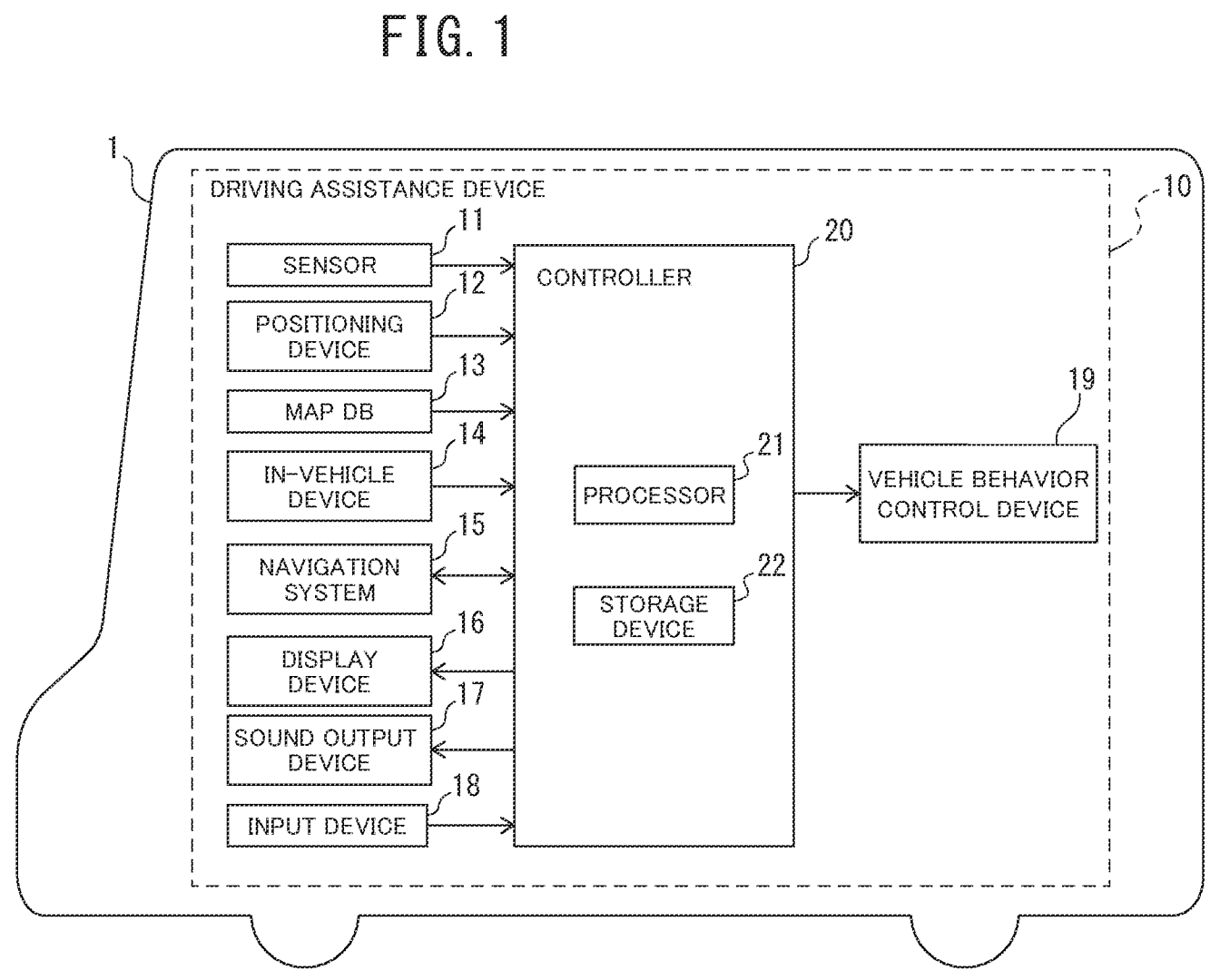
Figures 2, 3:
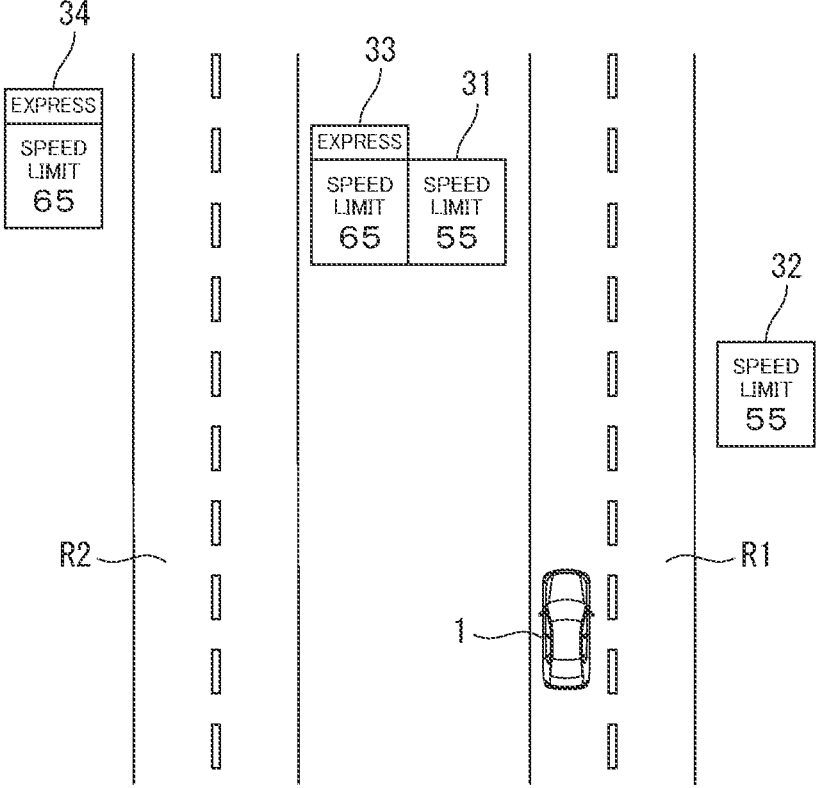
FIG. 2 is a diagram illustrative of a portion of an input device in FIG. 1.
FIG. 3 is an explanatory diagram of a first example of a situation in which a plurality of speed limit signs are recognized at the same time.

FIG. 1 is a diagram illustrative of an example of a schematic configuration of a vehicle on which a driving assistance device of an embodiment is mounted. A driving assistance device 10 mounted on a vehicle 1 includes a sensor 11, a positioning device 12, a map database (map DB) 13, an in-vehicle device 14, a navigation system 15, a display device 16, a sound output device 17, an input device 18, a vehicle behavior control device 19, and a controller 20. The above-described devices are connected to one another via, for example, a controller area network (CAN) or another in-vehicle LAN in order to perform transmission and reception of information with one another.

The sensor 11 detects a travel state of the vehicle 1. For example, the sensor 11 includes cameras, such as a front view camera for capturing a front view of the vehicle 1, a rear view camera for capturing a rear view of the vehicle 1, and side view cameras for capturing right and left side views of the vehicle 1. In addition, the sensor 11 includes radars, such as a front radar for detecting an obstacle in front of the vehicle 1, a rear radar for detecting an obstacle in the rear of the vehicle 1, and side radars for detecting an obstacle existing on the right and left lateral sides of the vehicle 1. Further, the sensor 11 includes a vehicle speed sensor for detecting vehicle speed of the vehicle 1, a touch sensor (capacitance sensor) for detecting holding of a steering wheel by a passenger (for example, a driver), an in-vehicle camera for imaging the passenger, and the like.

The positioning device 12 includes a GPS unit, a gyro sensor, a vehicle speed sensor, and the like. The positioning device 12 detects radio waves transmitted from a plurality of satellites by the GPS unit and periodically acquires position information of the vehicle 1. In addition, the positioning device 12 detects a current position of the vehicle 1, based on acquired position information of the vehicle 1, angle change information acquired from the gyro sensor, and vehicle speed acquired from the vehicle speed sensor.

The map database 13 is a memory that stores three-dimensional high-definition map information including position information of various types of facilities and specific points and is configured to be accessible from the controller 20. The three-dimensional high-definition map information is three-dimensional map information based on road shapes detected when a vehicle for data acquisition traveled on actual roads. The three-dimensional high-definition map information is map information in which detailed and highly precise position information of a curved road and the amount of curvature (for example, curvature or radius of curvature) of the road, a junction of roads, a branch point, a tollgate, a point of reduction in the number of lanes, and the like is associated with map information as three-dimensional information.

In addition, the three-dimensional high-definition map information includes speed limit information indicating speed limits of roads. The speed limit information may be information that is associated with, for example, a road or a lane and specifies a speed limit of the associated road or lane or may be information of installation positions of speed limit signs and speed limits specified by the signs.

The in-vehicle device 14 is various types of devices mounted on the vehicle 1 and operates in accordance with an operation by the passenger. Examples of such an in-vehicle device include a steering wheel, an accelerator pedal, a brake pedal, turn signals, windshield wipers, lights, a horn, other specific switches, and the like.

The navigation system 15 acquires current position information of the vehicle 1 from the positioning device 12 and displays map information for navigation on which the position of the vehicle 1 is superimposed on a display or the like. In addition, the navigation system 15 includes a navigation function to, when a destination is set, set a route to the destination and guide the passenger along the set route. The navigation function displays a route on a map on the display and informs the passenger of the route by voice or the like. A route set by the navigation system 15 is also used in a route travel assistance function that the controller 20 includes. The route travel assistance function is a function to cause the vehicle 1 to autonomously travel to a destination, based on a set route.

The display device 16 includes, for example, a display that the navigation system 15 includes, a display incorporated in a rearview mirror, a display incorporated in a meter section, a head-up display projected on a windshield, and the like. The display device 16 notifies the passenger of various types of presented information in accordance with control by the controller 20.

The sound output device 17 is a device to output acoustic information, such as a speaker that the navigation system 15 includes, a speaker of an audio device, and a buzzer. The sound output device 17 notifies the passenger of various types of presented information in accordance with control by the controller 20.

The input device 18 is a device, such as a button switch that enables the passenger to input an operation by manual operation, a touch panel arranged on a display screen, and a microphone that enables the passenger to input an operation by voice. The passenger, by operating the input device 18, is able to input setting information in response to presented information presented by the display device 16 and the sound output device 17.

FIG. 2 is a diagram illustrative of a portion of the input device 18 of the present embodiment. The input device 18 may be a button switch group that is arranged on, for example, a spoke of the steering wheel. The input device 18 is used when turning on and off and the like of an autonomous travel control function that the controller 20 includes are set. The input device 18 includes a main switch 181, a resume/accelerate switch 182, a set/coast switch 183, a cancel switch 184, an inter-vehicle distance adjustment switch 185, and a lane change assistance switch 186.

The main switch 181 is a switch to turn on and off the autonomous travel control function of the controller 20. The resume/accelerate switch 182 is a switch to, after the autonomous travel control function is turned off, set resumption of the autonomous travel control function at a set speed before the turning-off of the autonomous travel control function or to increase the set speed. The set/coast switch 183 is a switch to start the autonomous travel control function. In order to start the autonomous travel control function, after the autonomous travel control function is turned on by the main switch 181, the set/coast switch 183 is pressed. The set/coast switch 183 is also a switch to decrease the set speed. The cancel switch 184 is a switch to cancel the autonomous travel control function. The inter-vehicle distance adjustment switch 185 is a switch to set an inter-vehicle distance to a preceding vehicle. The lane change assistance switch 186 is a switch to, when the controller 20 confirms start of a lane change to the passenger, instruct (accept) the start of the lane change.

Note that, in addition to the button switch group illustrated in FIG. 2, a turn signal lever for the turn signals and a switch of another type of in-vehicle device 14 can be used as the input device 18. For example, when the passenger operates the turn signal lever in the case where whether or not a lane change is performed in an automated manner is proposed by the controller 20, a lane change in a direction in which the turn signal lever is operated is performed instead of the proposed lane change.

The vehicle behavior control device 19 controls vehicle behavior of the vehicle 1. For example, when the vehicle 1 performs constant speed travel at a set speed by the autonomous travel control function, the vehicle behavior control device 19 controls operation of a drive mechanism and brake operation to achieve acceleration/deceleration and travel speed that enable the vehicle 1 to travel at the set speed. In addition, when the vehicle 1 travels following a preceding vehicle by the autonomous travel control function, the vehicle behavior control device 19 also likewise controls operation of the drive mechanism and the brake. Note that the operation control of the drive mechanism includes operation of an internal-combustion engine in the case of an engine-driven vehicle and operation of a motor for traveling in the case of an electric vehicle. In addition, the operation control of the drive mechanism includes torque distribution between an internal-combustion engine and a motor for traveling in the case of a hybrid vehicle.

In addition, when the vehicle behavior control device 19 performs lane-keeping control, a lane change assistance function, a passing assistance function, or a route travel assistance function, which will be described later, by the autonomous travel control function, the vehicle behavior control device 19 performs, in addition to the operation control of the drive mechanism and the brake, steering control of the vehicle 1 by controlling operation of a steering actuator.

The controller 20 is one or a plurality of electronic control units (ECUs) for controlling travel of the vehicle 1 and includes a processor 21 and peripheral components, such as a storage device 22. The processor 21 may be, for example, a central processing unit (CPU) or a micro-processing unit (MPU). The storage device 22 may include a semiconductor storage device, a magnetic storage device, an optical storage device, and the like. The storage device 22 may include registers, a cache memory, and a memory, such as a read only memory (ROM) and a random access memory (RAM), that are used as main storage devices.

Functions of the controller 20, which will be described below, are achieved by, for example, the processor 21 executing computer programs stored in the storage device 22.

Note that the controller 20 may be formed using dedicated hardware for performing various types of information processing that will be described below. For example, the controller 20 may include a functional logic circuit that is implemented in a general-purpose semiconductor integrated circuit. For example, the controller 20 may include a programmable logic device (PLD), such as a field-programmable gate array (FPGA), and the like.

The controller 20 achieves a travel information acquisition function to acquire information relating to a travel state of the vehicle 1 and an autonomous travel control function to autonomously control travel speed and/or steering of the vehicle 1. The travel information acquisition function of the controller 20 is a function to acquire travel information relating to a travel state of the vehicle 1. For example, the controller 20 may acquire, as the travel information, image information of the outside of the vehicle captured by the front view camera, the rear view camera, and the side view cameras in the sensor 11. In addition, the controller 20 acquires, as the travel information, detection results by the front radar, the rear radar, and the side radars. Further, the controller 20 also acquires, as the travel information, vehicle speed information of the vehicle 1 detected by the vehicle speed sensor in the sensor 11 and image information of the face of the passenger captured by the in-vehicle camera.

Further, the controller 20 acquires, as the travel information, the current position information of the vehicle 1 from the positioning device 12. In addition, the controller 20 acquires, as the travel information, a set destination and a route to the destination from the navigation system 15. Further, the controller 20 acquires, as the travel information, position information of a curved road and the amount of curvature (for example, curvature or radius of curvature) of the road, a junction of roads, a branch point, a tollgate, a point of reduction in the number of lanes, and the like from the map database 13. Moreover, the controller 20 acquires, as the travel information, information about operation of the in-vehicle device 14 by the passenger from the in-vehicle device 14.

The autonomous travel control function of the controller 20 is a function to autonomously control travel of the vehicle 1 without depending on operation by the passenger. The autonomous travel control function of the controller 20 include an autonomous speed control function to autonomously control travel speed of the vehicle 1 and an autonomous steering control function to autonomously control steering of the vehicle 1. The autonomous speed control function and the autonomous steering control function of the present embodiment will be described below. Note that, in the present invention, the autonomous travel control function is only necessary to include only the autonomous speed control function, and the autonomous travel control function does not necessarily have to include the autonomous steering control function.

<Autonomous Speed Control Function>

The autonomous speed control function is a function to, when a preceding vehicle is detected, control the vehicle 1 to travel following the preceding vehicle while performing inter-vehicle distance control in such a way as to keep an inter-vehicle distance matching vehicle speed with a speed limit of a road on which the vehicle 1 is traveling or a vehicle speed set by the passenger as an upper limit.

In contrast, when no preceding vehicle is detected, the autonomous speed control function controls the vehicle 1 to perform constant speed travel at a speed limit of the road on which the vehicle 1 is traveling or a vehicle speed set by the passenger. The former and the latter are also referred to as inter-vehicle distance control and constant speed control, respectively.

The controller 20 may include a function to recognize a speed limit of a road on which the vehicle 1 is traveling from a road sign by the sensor 11 or recognize a speed limit from the map information in the map database 13 and automatically set the recognized speed limit as a set vehicle speed. A recognition method of a speed limit will be described later. The constant speed control is performed when it is detected by the front radar or the like in the sensor 11 that no preceding vehicle exists ahead in an own lane of the vehicle 1. In the constant speed control, the vehicle behavior control device 19 controls operation of the drive mechanism, such as the engine and the brake, in such a manner as to maintain a set traveling speed while feeding back vehicle speed data detected by the vehicle speed sensor.

The inter-vehicle distance control is performed when it is detected by the front radar or the like in the sensor 11 that a preceding vehicle exists ahead in the own lane of the vehicle 1. In the inter-vehicle distance control, the vehicle behavior control device 19 controls operation of the drive mechanism, such as the engine and the brake, in such a manner as to maintain a set inter-vehicle distance with a set travel speed as an upper limit while feeding back inter-vehicle distance data detected by the front radar.

<Autonomous Steering Control Function>

The autonomous steering control function is a function to perform the steering control of the vehicle 1 by controlling operation of the steering actuator.

The autonomous steering control function includes, for example, the lane-keeping function, the lane change assistance function, the passing assistance function, and the route travel assistance function.

The lane-keeping function is a function to assist steering of the passenger by controlling the steering actuator in such a way that, for example, the vehicle 1 travels along substantially the center of a lane.

When the set/coast switch 183 is pressed after the autonomous travel control function is turned on by the main switch 181, the controller 20 determines whether or not a predetermined autonomous travel control start condition is established. When the controller 20 determines that the autonomous travel control start condition is established, the controller 20 performs the lane-keeping function in the autonomous steering control function.

Alternatively, when the autonomous travel control start condition is established after the autonomous travel control function is turned on by the main switch 181, the controller 20 waits for the set/coast switch 183 to be pressed. When the set/coast switch 183 is pressed, the controller 20 starts the autonomous travel control and performs the lane-keeping function in the autonomous steering control function.

<Lane Change Assistance Function>

The lane change assistance function starts lane change operation that is a series of processing for automated lane change when the passenger operates the turn signal lever to turn on a turn signal and a predetermined lane change start condition is satisfied. The lane change assistance function determines whether or not the predetermined lane change start condition is established, based on various types of travel information acquired by the travel information acquisition function.

The lane change assistance function starts the lane change operation when the lane change start condition is satisfied. The lane change operation causes the vehicle 1 to laterally move to an adjacent lane and, when the movement to the adjacent lane is finished, turns off the turn signal and starts performance of the lane-keeping function in the adjacent lane.

<Passing Assistance Function>

When a preceding vehicle that is slower than the vehicle 1 exists ahead in the own lane of the vehicle 1 and a predetermined passing proposition condition is satisfied, the passing assistance function presents passing information to the passenger by the display device 16. In this configuration, the passing information is information for proposing passing the preceding vehicle to the passenger. The passing assistance function turns on a turn signal and starts the above-described lane change operation when the passenger accepts the passing by operating the lane change assistance switch 186 in the input device 18 in response to the presentation of the passing information and a preset passing start condition is satisfied. The passing assistance function determines whether or not the passing proposition condition and the passing start condition are established, based on various types of travel information acquired by the travel information acquisition function.

<Route Travel Assistance Function>

When a travel direction change point, such as a branch point, a junction, an exit, and a tollgate, exists in a set route, distance to the travel direction change point is within a predetermined distance, and a predetermined route travel proposition condition is satisfied, the route travel assistance function presents route travel information by the display device 16 and proposes a lane change toward the travel direction change point. In addition, the route travel assistance function starts lane change operation when the proposition of lane change is accepted by an operation of the lane change assistance switch 186 and a predetermined route travel start condition is satisfied.

The route travel assistance function determines whether or not the route travel proposition condition and the route travel start condition are established, based on various types of travel information acquired by the travel information acquisition function.

<Recognition Method of Speed Limit>

As described above, the controller 20 recognizes a speed limit of a road on which the vehicle 1 is traveling from a road sign by the sensor 11 or recognizes a speed limit from the map information in the map database 13 and uses the recognized speed limit as a set vehicle speed in the autonomous speed control function. In addition, the controller 20 displays the recognized speed limit on the display device 16. For example, the controller 20 displays the recognized speed limit on the display incorporated in the meter section and the head-up display projected on the windshield.

When the controller 20 recognizes a speed limit, the controller 20 acquires a captured image representing an environment in front of the vehicle 1 from the front view camera, which is a camera for imaging an environment in front of the vehicle 1, in the sensor 11. The controller 20 recognizes a speed limit sign from the acquired captured image, as well as estimating distance from the vehicle 1 to the speed limit sign. The distance from the vehicle 1 to the speed limit sign can be estimated by, for example, detecting coordinates of a ground contact position (grounding position) of a support structure of the speed limit sign from the captured image.

The controller 20 excludes a speed limit sign located at a position far from the vehicle 1 from a recognition result of a speed limit sign. For example, the controller 20 excludes a speed limit sign located at a position farther from the vehicle 1 than a threshold distance from the recognition result.

The controller 20, after having excluded a speed limit sign located at a position far from the vehicle 1, determines whether or not a speed limit sign is recognized from the captured image. That is, the controller 20 determines whether or not a speed limit sign other than a speed limit sign located at a position far from the vehicle 1 is recognized from the captured image. When a speed limit sign is recognized from the captured image, the controller 20 recognizes a speed limit that the speed limit sign recognized from the captured image indicates as a speed limit of a road on which the vehicle 1 travels. In addition, when no speed limit sign is recognized from the captured image, the controller 20 recognizes a speed limit of the road on which the vehicle 1 travels, based on speed limit information included in the three-dimensional high-definition map information. For example, the controller 20 may recognize a speed limit that is stored in the three-dimensional high-definition map information in association with the road on which the vehicle 1 travels as the speed limit of the road on which the vehicle 1 travels.

A plurality of speed limit signs are sometimes recognized at the same time from a captured image. FIG. 3 is an explanatory diagram of a first example of a situation in which a plurality of speed limit signs are recognized at the same time.

FIG. 3 illustrates a situation in which a plurality of roads including a first road R1 and a second road R2 are provided side by side and the vehicle 1 is traveling on the first road R1. For example, the first road R1 is a freeway and the second road R2 is an expressway in the United States of America. Speed limit signs 31 and 32 on the first road R1 indicate a comparatively low speed limit (in the example in FIG. 3, 55 miles per hour), and speed limit signs 33 and 34 on the second road R2 indicate a comparatively high speed limit (in the example in FIG. 3, 65 miles per hour).

In such a case, the speed limit signs 31 and 32 on the first road R1 and the speed limit signs 33 and 34 on the second road R2 are sometimes recognized from a captured image at the same time. That is, a plurality of speed limit signs recognized from a captured image at the same time sometimes indicate a plurality of different speed limits (in the example in FIG. 3, 55 miles per hour and 65 miles per hour).

When a plurality of speed limit signs are recognized from a captured image at the same time as described above, there is a risk that a sign that is not a speed limit sign of the road on which the vehicle 1 is traveling is falsely recognized as a speed limit sign of the road on which the vehicle 1 is traveling.

In the example in FIG. 3, there is a risk that 65 miles per hour that is a speed limit that the speed limit signs 33 and 34 on the second road R2, which is not the road on which the vehicle 1 is traveling, indicate is falsely recognized as the speed limit of the road on which the vehicle 1 travels.

Thus, the controller 20 determines whether or not a plurality of speed limit signs are recognized from a captured image and, when the controller 20 determines that a plurality of speed limit signs are recognized, determines whether or not the recognized plurality of speed limit signs include speed limit signs that respectively exist in the right front and the left front of the vehicle 1 and indicate the same speed limit.

In the example in FIG. 3, the controller 20 determines that the plurality of speed limit signs 31 to 34 are recognized from a captured image. The controller 20 determines that the plurality of speed limit signs 31 to 34 include the speed limit signs 31 and 32 that exist in the right front and the left front of the vehicle 1, respectively, and indicate the same speed limit (in the example in FIG. 3, 55 miles per hour).

Note that the speed limit signs 31 and 32 do not necessarily have to be signs that are located at right and left road edges of the first road R1. The speed limit signs 31 and 32 are only required to be detected at, for example, coordinates on the right side and coordinates on the left side of the center in the lateral direction of the captured image, respectively.

When the controller 20 determines that the plurality of speed limit signs include speed limit signs that respectively exist in the right front and the left front of the vehicle 1 and indicate the same speed limit, the controller 20 recognizes a speed limit that the speed limit signs that respectively exist in the right front and the left front of the vehicle 1 indicate to be the speed limit of the road on which the vehicle 1 travels.

In the example in FIG. 3, the controller 20 recognizes 55 miles per hour that is a speed limit that the speed limit signs 31 and 32 indicate to be the speed limit of the first road R1.

This configuration can prevent a speed limit that a speed limit sign of an adjacent road indicates from being falsely recognized to be the speed limit of the road on which the vehicle 1 travels in a section in which a plurality of roads are provided side by side.

Figure 4:
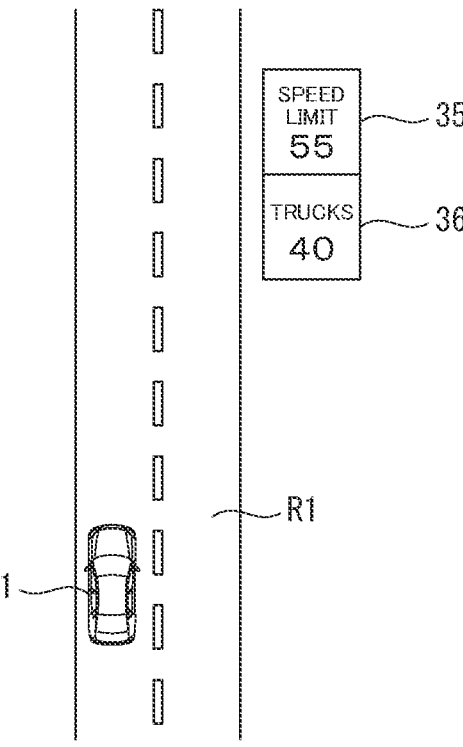
FIG. 4 is an explanatory diagram of a second example of the situation in which a plurality of speed limit signs are recognized at the same time.

FIG. 4 is an explanatory diagram of a second example of the situation in which a plurality of speed limit signs are recognized at the same time.

In the example in FIG. 4, a plurality of speed limit signs 35 and 36 are placed close to each other and form a group of speed limit signs. When a plurality of speed limit signs are placed close to one another as described above, the plurality of speed limit signs sometimes include, for example, a speed limit sign indicating a speed limit for a specific type of vehicle and a speed limit sign indicating a speed limit for a type of vehicle other than the specific type of vehicle. In addition, a plurality of speed limit signs sometimes include a speed limit sign indicating a maximum speed and a speed limit sign indicating a minimum speed. In the example in FIG. 4, the speed limit sign 36 indicating a speed limit (in the example in FIG. 4, 40 miles per hour) for a truck and the speed limit sign 35 indicating a speed limit (in the example in FIG. 4, 55 miles per hour) for a vehicle other than a truck are placed close to each other.

In such a case, the plurality of speed limit signs 35 and 36 that respectively indicate a plurality of different speeds are sometimes recognized from a captured image at the same time.

In this case, there is a risk that a speed that the speed limit sign 36 indicating a speed limit for a specific type of vehicle different from the vehicle 1 indicates is recognized as a speed limit for the vehicle 1. Alternatively, there is a risk that a speed that the speed limit sign indicating the minimum speed indicates is recognized as a speed limit representing the maximum speed for the vehicle 1.

Thus, when the controller 20 determines that a plurality of speed limit signs are recognized from a captured image and the recognized plurality of speed limit signs do not include speed limit signs that respectively exist in the right front and the left front of the vehicle 1 and indicate the same speed limit, the controller 20 determines whether or not the recognized plurality of speed limit signs include a group of speed limit signs close to one another.

When the controller 20 determines that the recognized plurality of speed limit signs include a group of speed limit signs close to one another, the controller 20 recognizes the highest speed among speeds that the group of speed limit signs close to one another indicate to be the speed limit of the road on which the vehicle 1 travels.

In the example in FIG. 4, the controller 20 recognizes 55 miles per hour that is the higher one between a speed (55 miles per hour) that the speed limit sign 35 indicates and a speed (40 miles per hour) that the speed limit sign 36 indicates to be the speed limit of the road on which the vehicle 1 travels.

When a plurality of speed limit signs are placed close to one another, this configuration can prevent a speed limit for a specific type of vehicle different from the vehicle 1 from being falsely recognized as a speed limit for the vehicle 1.

In addition, it is possible to prevent a speed that a speed limit sign indicating the minimum speed indicates from being falsely recognized as a speed limit representing the maximum speed for the vehicle 1.

The controller 20 may determine whether or not speed limit signs are a group of speed limit signs close to one another depending on whether or not the speed limit signs exist within a predetermined distance range. The predetermined distance may be appropriately set in accordance with a rule or a standard for placing a road sign. For example, the predetermined distance may be 3 m.

For example, the controller 20 may successively select a speed limit sign from the recognized plurality of speed limit signs and, with the selected speed limit sign used as a reference, extract all speed limit signs existing within a predetermined distance from the speed limit sign serving as the reference in the right-left direction, the front-rear direction, and the up-down direction as a group of speed limit signs close to one another.

When the recognized plurality of speed limit signs include neither speed limit signs that respectively exist in the right front and the left front of the vehicle 1 and indicate the same speed limit nor a group of speed limit signs close to one another, the controller 20 recognizes a speed limit that a speed limit sign existing in a predetermined direction, the predetermined direction being a predetermined one direction of the right front and the left front of the vehicle 1, indicates to be the speed limit of the road on which the vehicle 1 travels. For example, the controller 20 recognizes a speed limit that the speed limit sign existing in the right front of the vehicle 1 indicates to be the speed limit of the road on which the vehicle 1 travels.

When a plurality of speed limit signs exist in the predetermined direction, the controller 20 recognizes a speed limit that the closest speed limit sign indicates to be the speed limit of the road on which the vehicle 1 travels.

Alternatively, the controller 20 may recognize a speed limit that the closest speed limit sign among the plurality of speed limit signs indicates to be the speed limit of the road on which the vehicle 1 travels.

Note that although, in the above-described explanation, the controller 20 determines whether or not the recognized plurality of speed limit signs include speed limit signs that respectively exist in the right front and the left front of the vehicle 1 and indicate the same speed limit and, when the recognized plurality of speed limit signs do not include speed limit signs that respectively exist in the right front and the left front of the vehicle 1 and indicate the same speed limit, determines whether or not the recognized plurality of speed limit signs include a group of speed limit signs close to one another, the present invention does not limit a determination sequence. For example, when the recognized plurality of speed limit signs do not include a group of speed limit signs close to one another, the controller 20 may determine whether or not the recognized plurality of speed limit signs include speed limit signs that respectively exist in the right front and the left front of the vehicle 1 and indicate the same speed limit, or the controller 20 may recognize a speed limit by comprehensively determining whether or not the recognized plurality of speed limit signs include speed limit signs that respectively exist in the right front and the left front of the vehicle 1 and indicate the same speed limit and whether or not the recognized plurality of speed limit signs include a group of speed limit signs close to one another.

(Operation)

FIG. 5 is a flowchart of an example of a speed limit recognition method of the embodiment.

In step S1, the controller 20 acquires a captured image representing an environment in front of the vehicle 1 from the front view camera in the sensor 11.

In step S2, the controller 20 recognizes a speed limit sign from the acquired captured image.

In step S3, the controller 20 excludes a speed limit sign located at a position far from the vehicle 1 from a recognition result of a speed limit sign.

In step S4, the controller 20 determines whether or not a speed limit sign is recognized from the captured image. That is, the controller 20 determines whether or not a speed limit sign other than a speed limit sign located at a position far from the vehicle 1 is recognized from the captured image. When a speed limit sign is recognized from the captured image (step S4: Y), the process proceeds to step S6. When no speed limit sign is recognized from the captured image (step S4: N), the process proceeds to step S5.

In step S5, the controller 20 recognizes a speed limit of a road on which the vehicle 1 travels, based on speed limit information included in the three-dimensional high-definition map information. Subsequently, the process terminates.

In step S6, the controller 20 determines whether or not a plurality of speed limit signs are recognized. When a plurality of speed limit signs are recognized (step S6: Y), the process proceeds to step S8. When only a single speed limit sign is recognized (step S6: N), the process proceeds to step S7.

In step S7, the controller 20 recognizes a speed limit that the recognized single speed limit sign indicates as the speed limit of the road on which the vehicle 1 travels. Subsequently, the process terminates.

In step S8, the controller 20 determines whether or not the recognized plurality of speed limit signs include speed limit signs that respectively exist in the right front and the left front of the vehicle 1 and indicate the same speed limit. When the recognized plurality of speed limit signs do not include such speed limit signs (step S8: N), the process proceeds to step S10. When the recognized plurality of speed limit signs include such speed limit signs (step S8: Y), the process proceeds to step S9.

In step S9, the controller 20 recognizes a speed limit that the speed limit signs that respectively exist in the right front and the left front of the vehicle 1 indicate as the speed limit of the road on which the vehicle 1 travels. Subsequently, the process terminates.

In step S10, the controller 20 determines whether or not the recognized plurality of speed limit signs include a group of speed limit signs close to one another. When the recognized plurality of speed limit signs do not include a group of speed limit signs close to one another (step S10: N), the process proceeds to step S12. When the recognized plurality of speed limit signs include a group of speed limit signs close to one another (step S10: Y), the process proceeds to step S11.

In step S11, the controller 20 recognizes the highest speed among speeds that the group of speed limit signs close to one another indicate to be the speed limit of the road on which the vehicle 1 travels. Subsequently, the process terminates.

In step S12, the controller 20 recognizes a speed limit that a speed limit sign that exists in a predetermined direction, the predetermined direction being a predetermined in advance and fixed as one direction of the right front and the left front of the vehicle 1, indicates to be the speed limit of the road on which the vehicle 1 travels. Subsequently, the process terminates.

Advantageous Effects of Embodiment (1) The controller 20 acquires a captured image representing an environment in front of the vehicle 1 from a camera, recognizes a speed limit sign from the captured image, determines whether or not a plurality of speed limit signs are recognized from the captured image, when determining that a plurality of speed limit signs are recognized, determines whether or not the recognized plurality of speed limit signs include speed limit signs that respectively exist in the right front and the left front of the vehicle 1 and indicate the same speed limit, and, when determining that the recognized plurality of speed limit signs include speed limit signs that respectively exist in the right front and the left front of the vehicle 1 and indicate the same speed limit, recognizes a speed limit that the speed limit signs that respectively exist in the right front and the left front of the vehicle 1 indicate to be a speed limit of a road on which the vehicle 1 travels.

This configuration can prevent a speed limit that a speed limit sign of an adjacent road indicates from being falsely recognized to be the speed limit of the road on which the vehicle 1 travels in a section in which a plurality of roads are provided side by side.

(2) The controller 20 may, when determining that the recognized plurality of speed limit signs do not include speed limit signs that respectively exist in the right front and the left front of the vehicle 1 and indicate the same speed limit, determine whether or not the recognized plurality of speed limit signs include a group of speed limit signs close to one another and, when determining that the recognized plurality of speed limit signs include a group of speed limit signs close to one another, recognize the highest speed among speeds that the group of speed limit signs respectively indicate to be the speed limit of the road on which the vehicle 1 travels.

When a plurality of speed limit signs are placed close to one another, this configuration can prevent a speed limit for a specific type of vehicle different from the vehicle 1 from being falsely recognized as a speed limit for, or a speed limit applied to, the vehicle 1. In addition, it is possible to prevent a speed that a speed limit sign indicating the minimum speed indicates from being falsely recognized as a speed limit representing the maximum speed for the vehicle 1.

(3) The controller 20 may select one speed limit sign of the recognized plurality of speed limit signs as a reference, determine whether or not another speed limit sign of the recognized plurality of speed limit signs exists within a range of a predetermined distance from the one speed limit sign serving as the reference, and, when determining that the another speed limit sign exists within the range of the predetermined distance from the one speed limit sign serving as the reference, extract the one speed limit sign serving as the reference and the another speed limit sign as speed limit signs included in a group of speed limit signs close to one another.

This configuration enables whether or not the recognized plurality of speed limit signs include a group of speed limit signs close to one another to be determined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Vehicle
10 Driving assistance device
11 Sensor
12 Positioning device
13 Map database
14 In-vehicle device
15 Navigation system
16 Display device
17 Sound output device
18 Input device
19 Vehicle behavior control device
20 Controller
21 Processor
22 Storage device

The invention claimed is:

1. A speed limit recognition method causing a controller to execute processing comprising:
acquiring a captured image representing an environment in front of an own vehicle from a camera;
recognizing a speed limit sign from the captured image acquired by the camera;
determining whether or not a plurality of speed limit signs are recognized from the captured image acquired by the camera;
when determining that only a single speed limit sign is recognized, recognizing a speed limit that the recognized single speed limit sign indicates as a speed limit of a road on which the own vehicle travels;
when determining that the plurality of speed limit signs are recognized, determining whether or not the plurality of speed limit signs include speed limit signs respectively existing in right front and left front of the own vehicle and indicating a same speed limit;
when determining that the plurality of speed limit signs include speed limit signs respectively existing in a right front and a left front of the own vehicle and indicating a same speed limit, recognizing a speed limit indicated by the speed limit signs respectively existing in the right front and the left front of the own vehicle to be a speed limit of a road on which the own vehicle travels;
when determining that the plurality of speed limit signs do not include speed limit signs respectively existing in the right front and the left front of the own vehicle and indicating a same speed limit, determining whether or not the plurality of speed limit signs include a group of speed limit signs close to one another;
when determining that the plurality of speed limit signs include a group of speed limit signs close to one another, recognizing a highest speed among speeds respectively indicated by the group of speed limit signs to be a speed limit of a road on which the own vehicle travels,
when determining that the plurality of speed limit signs do not include a group of speed limit signs close to one another, recognizing a speed limit that a closest speed limit sign to the own vehicle among the plurality of speed limit signs existing in a predetermined direction indicates to be a speed limit of a road on which the own vehicle travels, the predetermined direction being a direction predetermined in advance and fixed as one of a right front direction and a left front direction of the own vehicle; and
automatically setting a vehicle speed of the own vehicle as the recognized speed limit of the road on which the own vehicle travels,
wherein the own vehicle is a vehicle other than a specific type of vehicle to which a relatively low speed limit is applied among a plurality of types of vehicles having different speed limits.

2. The speed limit recognition method according to claim 1 causing the controller to execute processing comprising:
selecting one speed limit sign of the plurality of speed limit signs;
determining whether or not another speed limit sign of the plurality of speed limit signs exists within a range of a predetermined distance from the one speed limit sign;
when determining that the another speed limit sign exists within a range of a predetermined distance from the one speed limit sign, extracting the one speed limit sign and the another speed limit sign as speed limit signs included in the group of speed limit signs close to one another.

3. The speed limit recognition method according to claim 1, causing the controller to execute processing of determining whether or not the plurality of speed limit signs include speed limit signs indicating a same speed limit, one of the speed limit signs existing in the right front of the own vehicle and at a right road edge of the road on which the own vehicle travels, another of the speed limit signs existing in the left front of the own vehicle and at a left road edge of the road on which the own vehicle travels.

4. A speed limit recognition device comprising:
a camera configured to capture an environment in front of an own vehicle; and
a controller configured to execute processing including recognizing a speed limit sign from a captured image acquired by the camera, determining whether or not a plurality of speed limit signs are recognized from the captured image acquired by the camera, when determining that only a single speed limit sign is recognized, recognizing a speed limit that the recognized single speed limit sign indicates as a speed limit of a road on which the own vehicle travels, when determining that the plurality of speed limit signs are recognized, determining whether or not the plurality of speed limit signs include speed limit signs respectively existing in right front and left front of the own vehicle and indicating a same speed limit, when determining that the plurality of speed limit signs include speed limit signs respectively existing in a right front and a left front of the own vehicle and indicating a same speed limit, recognizing a speed limit indicated by the speed limit signs respectively existing in the right front and the left front of the own vehicle to be a speed limit of a road on which the own vehicle travels, when determining that the plurality of speed limit signs do not include speed limit signs respectively existing in the right front and the left front of the own vehicle and indicating a same speed limit, determining whether or not the plurality of speed limit signs include a group of speed limit signs close to one another, and when determining that the plurality of speed limit signs include a group of speed limit signs close to one another, recognizing a highest speed among speeds respectively indicated by the group of speed limit signs to be a speed limit of a road on which the own vehicle travels, when determining that the plurality of speed limit signs do not include a group of speed limit signs close to one another, recognizing a speed limit that a closest speed limit sign to the own vehicle among the plurality of speed limit signs existing in a predetermined direction indicates to be a speed limit of a road on which the own vehicle travels, the predetermined direction being a direction predetermined in advance and fixed as one of a right front direction and a left front direction of the own vehicle, and automatically setting a vehicle speed of the own vehicle as the recognized speed limit of the road on which the own vehicle travels, wherein the own vehicle is a vehicle other than a specific type of vehicle to which a relatively low speed limit is applied among a plurality of types of vehicles having different speed limits.

5. The speed limit recognition device according to claim 4, wherein the controller executes processing of determining whether or not the plurality of speed limit signs include speed limit signs indicating a same speed limit, one of the speed limit signs existing in the right front of the own vehicle and at a right road edge of the road on which the own vehicle travels, another of the speed limit signs existing in the left front of the own vehicle and at a left road edge of the road on which the own vehicle travels.

\* \* \* \* \*